March 18, 1952  J. H. JACOBSON  2,589,815
JOINT FOR CONCRETE SLABS
Filed June 18, 1945  2 SHEETS—SHEET 1
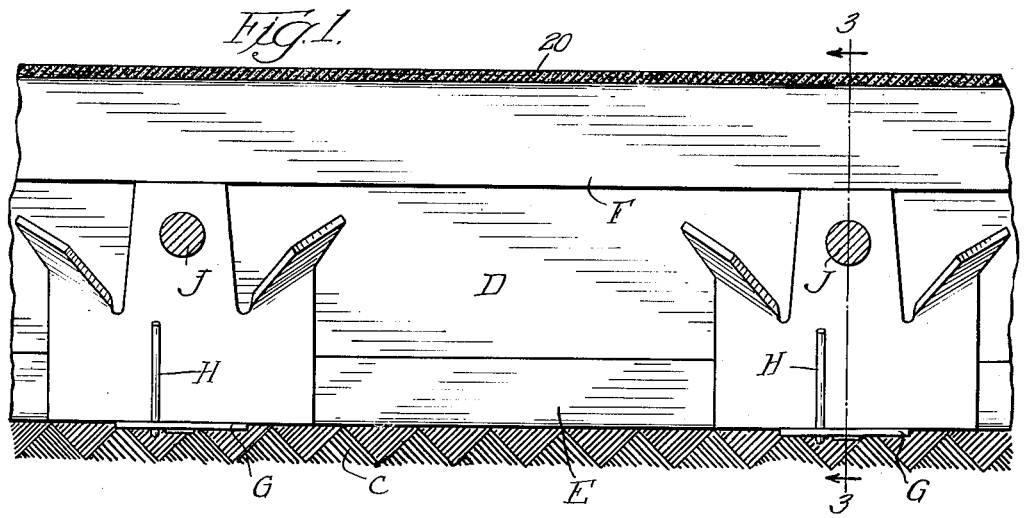
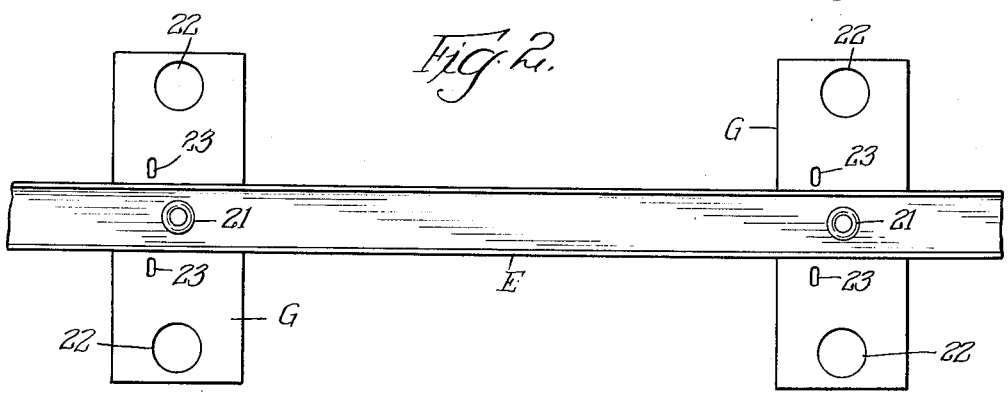
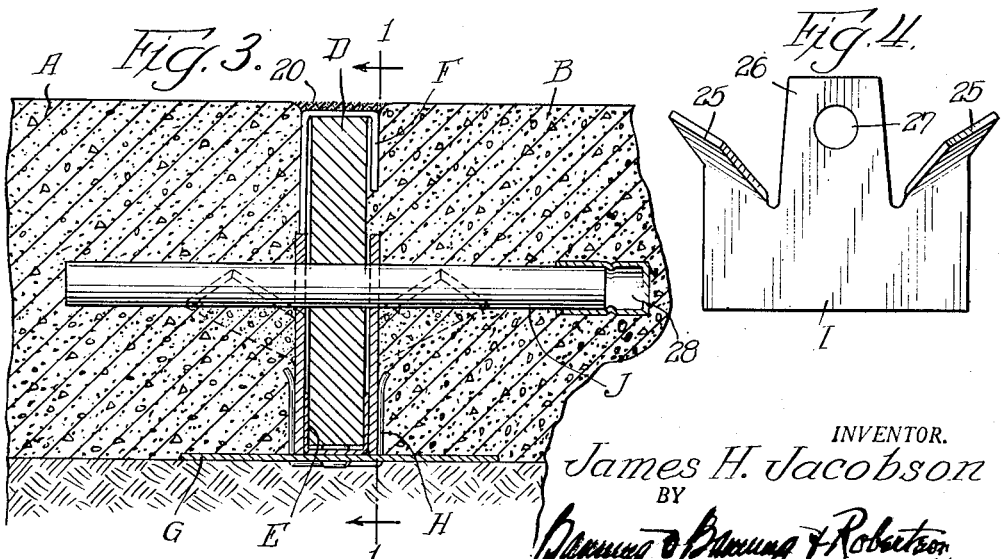
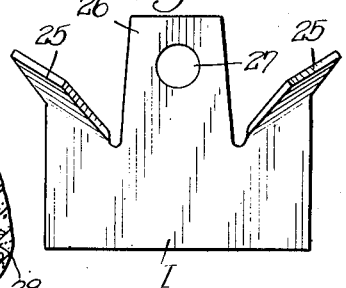
INVENTOR.
James H. Jacobson
BY
Banning & Banning & Robertson
Attys.

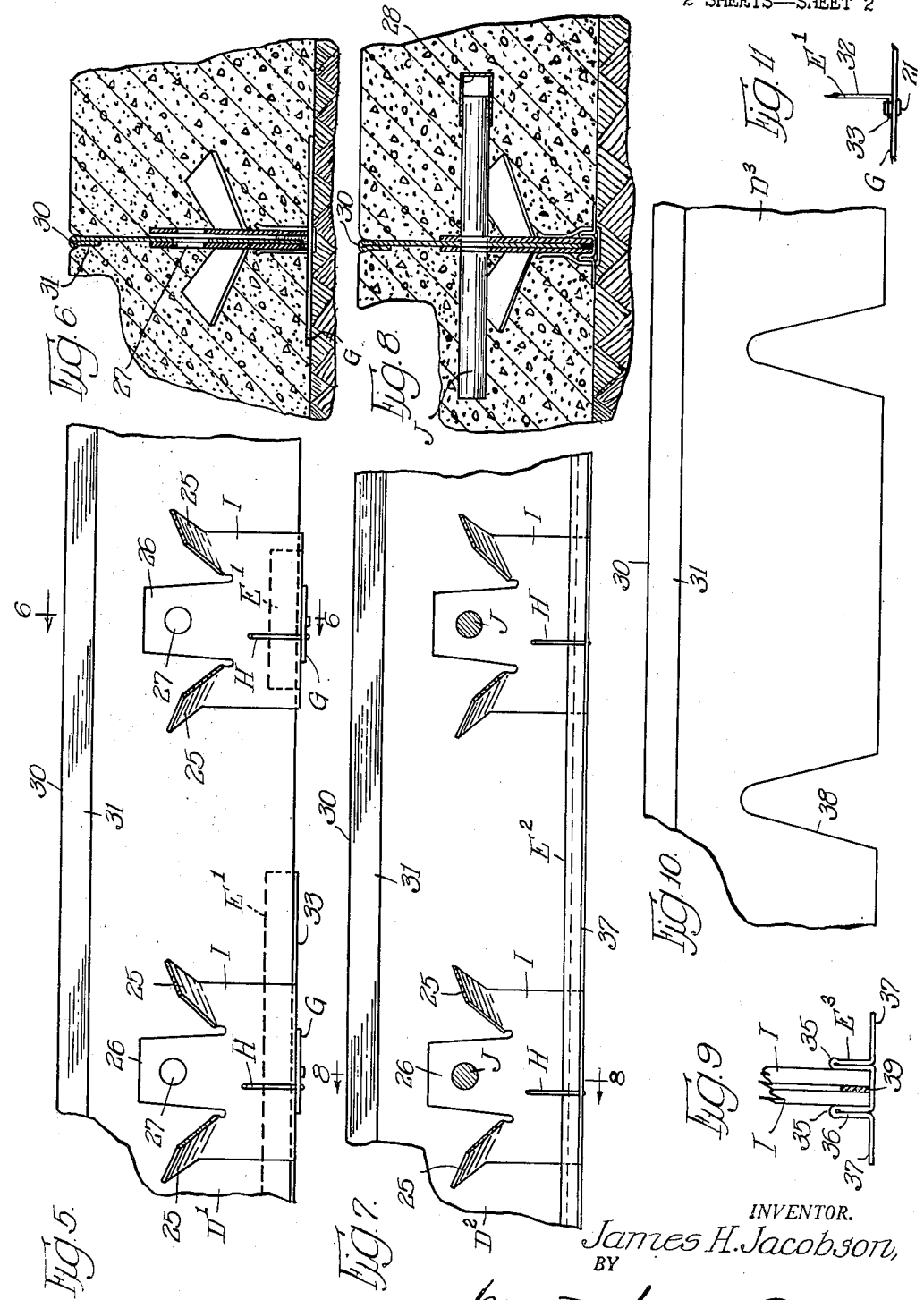

Patented Mar. 18, 1952

2,589,815

UNITED STATES PATENT OFFICE 2,589,815

JOINT FOR CONCRETE SLABS

James H. Jacobson, Chicago, Ill.

Application June 18, 1945, Serial No. 600,023

11 Claims. (Cl. 94—18)

This invention relates to a joint for adjacent slabs of concrete or the like, such as are commonly poured in the construction of highways, airports, industrial floors, etc. A primary object of my invention is, of course, to provide a joint which will safely and adequately transmit loads from one slab to another.

Load transmitting joints are required to withstand varying conditions, among them being thermal changes with resulting contractions and expansion of the concrete slabs, deleveling of one slab relative to another, resistance to load forces which are variously applied, depending upon direction, speed, weight, continuity, etc. Under all such diverse conditions which are commonly encountered in use, the concrete slabs, particularly at the joints, tend to disintegrate, spall, or become deleveled, thereby weakening the reinforcement and support which each slab should furnish to the ones which are adjacent.

The present road joint is designed to adequately reinforce and protect the concrete slabs at the points where load transference takes place. In addition, it is advantageous in its simplicity and the ease and facility with which it may be installed. It is also adaptable readily to highway, airport, or other constructions with a minimum of preparatory work at the place where the job is to be performed.

Certain suggestive embodiments of my invention are set forth in the accompanying drawings wherein—

Figure 1 is a longitudinal section through a portion of a road joint wherein is installed a joint assembly according to one form of my invention, the section being taken on line 1—1 of Fig. 3;

Fig. 2 is a top plan view of the reinforcing bar-foot assembly;

Fig. 3 is a transverse section which shows the joint assembly in the plane of line 3—3 of Fig. 1;

Fig. 4 is a detail in side elevation of one of the bearing plates per se;

Fig. 5 which is a view similar to Fig. 1 shows a portion of a joint assembly for a contraction joint, together with one each of two spaced pairs of bearing plates fitted thereto;

Fig. 6 is a transverse section through a completed contraction joint (minus only the dowel which is omitted for clarity of illustration), taken on line 6—6 of Fig. 5;

Fig. 7 which is a view similar to Fig. 5, shows a contraction joint assembly having a modification in the base reinforcement;

Fig. 8 is a transverse section through the completed joint of Fig. 7, taken on line 8—8 thereof;

Fig. 9 is a fragmentary detail, enlarged, in elevation, of one end of the bearing plate channel assembly shown in Fig. 8;

Fig. 10 is a side elevation of the spacer member per se adapted for use in the contraction joint produced by the assemblies of Figs. 5–8;

Fig. 11 is an enlarged fragmentary detail, in elevation, of one end of the foot-reinforcement assembly shown in Fig. 6.

Referring first to Figs. 1 and 3, I have here shown an expansion joint, adapted for use between adjacent slabs A and B of concrete or the like which are based upon a suitable sub-grade C. The slabs are poured on opposite sides of the joint assembly which constitutes substantially the entire joint. As shown, this assembly includes a spacer member D extending lengthwise of the joint, the bottom edge of this spacer member being fitted with a reinforcing bar E here shown as a channel. The upper edge of the spacer member is protected by a cap F. This may take the form of an inverted channel bar terminating below the top surface of the adjacent slabs, the space therebetween being filled with a sealing material 20 such as a bituminous compound or the like.

At spaced points lengthwise of the base channel bar E I provide connections, such as eyelets 21, whereby to secure thereto feet which may take the form of plates G, centrally pivoted to the eyelets, so as to have capacity for swinging to transverse positions, as shown in the drawing, or into parallelism with the bar. In the latter position, these plates will occupy the minimum space, and when so disposed will facilitate storage, packing, and handling of the foot-channel assembly. The length of each channel bar may be anything up to that of the spacer member to be installed between two adjacent concrete slabs, consequently with the foot plates assembled on a bar at the factory, these several parts will constitute a single unit for handling. When preparing for installation, the plates are swung to transverse positions, each to provide a pair of oppositely extending feet adapted to rest upon the sub-grade and support the spacer member in vertical position.

Each foot plate G is provided near its opposite ends with a hole 22 through which may be driven a stake (not shown) to enter the sub-grade whereby to secure the spacer member fixedly before pouring of the concrete. In addition, I provide a pair of oppositely disposed closed slots 23 in each plate, positioned just to the outside of the base channel bar (see Fig. 2). Through these slots may be inserted a U-shaped spring clip H, of wire or the like, the two legs of the clip extending upwardly through the slots to take up positions adjacent the base channel bar. Preferably the ends of the clip are out-turned slightly, as shown in Fig. 3.

With the parts thus far described, I associated a plurality of bearing plates I, arranged in pairs, one adjacent each clip. Each bearing plate, desirably made of steel, may be of any suitable design, the one here shown being produced from a rectangular blank of sheet metal to provide a pair of wings 25 separated from each other by a central tongue 26. The two wings are struck out to lie on the same side of the plate in angular positions which incline away from each other as well as from the vertical plane in which the plate body is disposed. The wings therefore are so disposed as to project away from one face of the joint into the adjacent concrete slab which, when poured, will entirely surround both wings, thereby locking each bearing plate fixedly in place.

The central tongue of each bearing plate is formed with a hole 27. When two plates are oppositely disposed with their lower edges resting upon or adjacent a foot plate G, the holes 27 are in register and capable of receiving through them and through a registering opening in the intervening spacer member a dowel J here shown in the form of a pin which may lie in a horizontal plane at a substantial distance below the top surface of the concrete slabs into which both end portions of the dowel project. The dowel pin which is fixedly connected to one bearing plate, as by a drive fit, is freely slidable through the other to present its end within a cap 28 which is slidably fitted thereto. In case of contraction or expansion of the concrete slabs at opposite sides of the joint, the dowel which remains fixedly anchored with respect to one slab is free to move within the other and within the cap which is fitted thereto, thereby adjusting itself to the slab movements occurring under such conditions.

The two bearing plates are disposed to lie alongside of and adjacent the reinforcing base bar and spacer member upstanding therefrom. To fit the bearing plates in place, each spring clip is pushed back sufficiently to receive the bearing plate between one of its legs and the proximate wall of the reinforcing bar. This results in a securement of the two bearing plates under sufficient tension to assure their retention in fixed positions with the spacer-foot-channel assembly. When the parts are so assembled the dowels serve to position the bearing plates correctly with respect to the spacer member. The entire joint assembly is then ready to be placed in operative position upon the base provided by the sub-grade or other foundation, whereby to serve as a connecting joint for two adjacent concrete slabs to be formed in an ensuing pouring operation.

The description up to this point has been concerned with an expansion joint which makes use of a yieldable spacer member between the adjacent slabs of concrete. My invention is equally adaptable to a contraction joint in which there is little or no provision for expansion of the concrete slabs. Joints of this character are recommended in many places. Certain suggestive embodiments of my contraction joint are illustrated in Figs. 5–11 to which reference will now be made.

A spacer member D' of sheet steel, or other suitable material, may be employed in this construction. Preferably the spacer member D' is formed with a return bend 30 near its top edge to provide a reinforcing ply 31. Additional reinforcing means E' may be provided along the base of the spacer member, as by an angle bar (see Fig. 11) having a vertical wall 32 with a flange 33 extending laterally at the bottom. This reinforcing bar may be extended for the full length of the spacer member or for any lesser distance. By way of example, the showings in Figs. 5 and 11 indicate one angle bar of indefinite length on opposite sides of which is mounted a pair of bearing plates I of any approved construction; also a second pair of like bearing plates I on opposite sides of an angle plate having a vertical wall 32 and a lateral flange 33 at its bottom. The bearing plate proximate the angle bar is located at the outside thereof and the two bearing plates lie on opposite sides of the spacer member. The angle bar fits in between one of the bearing plates and the spacer member. The spacer member reinforcement E' at the base, whether it be an elongated bar or a relatively short plate, furnishes a mounting for one or more foot plates G each connected swivelly to the base of the reinforcement, as by a hollow rivet 21. The bearing plates are arranged, one on each side of the spacer member, to receive engagement from opposite legs of a spring clip H the same as already described. The construction of the bearing plates may, if desired, follow the ones already described, and since they are illustrated as identical therewith like reference numerals have been employed to designate their corresponding parts.

In Figs. 7 and 8 I have shown an exactly similar construction, the only difference being that the base reinforcement $E^2$ for the spacer member $D^2$ is in the form of a channel bar of whatever length desired, the walls of this bar having a return bend at 35 to provide a depending outer ply 36 which at its base is outwardly turned to provide flanges 37 which will afford vertical support for the associated spacer member. The flanges 37 are located at the bottom of the channel bar and they project laterally from opposite sides of the channel member and constitute feet and are spaced laterally from each other, as clearly illustrated in Fig. 9 of the drawings. The laterally extending flanges or feet 37 are adapted to rest upon the sub-grade and they support the joint assembly in an upright position. The bearing plates I, whatever be their form, are positioned within the channeled reinforcing bar $E^2$, adjacent the up-standing walls thereof, and held in place by engaging spring means, such as the clip H whose legs are upwardly extended for this purpose through apertures (not shown) in the flanges 37.

A spacer member $D^3$ for a contraction joint need not remain in place after the concrete slabs have been poured and set. The important thing is that the spacer member $D^3$ be provided with supporting means at its base including the channel bar $E^3$ whereby to be sustained vertically during the pouring operations, and with bearing plates and dowels to interlock with the concrete when poured. The spacer member $D^3$ itself will serve no useful purpose by remaining in place between the slabs, consequently provision is made for its removal therefrom. The bend at the spacer member $D^3$ top is ordinarily exposed between the top surfaces of the adjacent slabs to permit application of an appropriate tool whereby to lift the spacer member $D^3$ out from between the slabs in its entirety. To facilitate withdrawal of the spacer member $D^3$, its opposite surfaces may be greased at the time the entire assembly is installed in operative position. Following removal of the spacer member D³, the narrow space at the joint may be filled with a suitable sealing compound.

To permit the spacer member D³ to disengage itself from the parts associated therewith, I form along its bottom edge a series of slots 38, each slot extending upwardly for perhaps half the vertical height of the spacer member D³ at which point its width remains sufficient to accommodate the dowel which is to be extended transversely across the joint. It will be apparent that the spacer member D³ so formed is free to be moved vertically out of the joint from between the two slabs, and in so doing leave behind undisturbed the dowel-connected bearing plates in their operative positions.

In the showing of Figs. 7–9 it will be observed that I am able to dispense with separate feet. This is possible because I utilize for this purpose the out-turned flanges at the base of the channeled reinforcing bar E² or E³ into which the several bearing plates are fitted. In practice, a spread of rubber compound 39 in a free flowing state may be applied within the channel; when the spacer member with assembled bearing plates is then fitted within the channel of the reinforcing bar, this rubber compound is displaced so as to rise between the bearing plates as shown clearly in Figs. 8 and 9. After the spacer member has been withdrawn from the joint, the rubber compound remains in place, extending continuously the length of the channeled reinforcing bar E² or E³ for substantially the full depth thereof to provide a seal with which the concrete slabs make continuous contact except where the bearing plates intervene. Optionally the liquid sealing compound 39 may be poured in place to whatever depth is desired after removal of the spacer member E³ from the joint, the effect being substantially the same. After removal of the spacer member E³ a sealing material (not shown), may be applied to the joint along its top; to assist in placing this top seal, a wedge bar (not shown) may be driven into the space between the slabs to be supported frictionally in place therebetween at a point slightly below the top surfaces thereof. Such a wedge bar will afford ample support to the sealing material that is applied thereover. With a sealing compound 39 spread along the base of the spacer member, there will then be a seal extending continuously along the joint adjacent both the top and bottom faces of the slabs. Manifestly the protection afforded by such a double seal will enhance appreciably the serviceable life of the load transference joint between the slabs.

According to my invention, the spacer member serves as a backbone or frame, extending lengthwise of the joint. It is provided with an adequate base reinforcement to furnish a mounting on which opposed bearing plates or load distributing devices are spring-held in operative positions where they may be locked positively by dowels which, together with the plates or devices, are later embedded, in fixed parallel positions, in the adjacent concrete slabs after pouring has taken place. Manifestly, in any such joint assembly the bearing plates or load distributing devices will occupy predetermined positions whereby to facilitate their installation in the joint. All parts necessary to a satisfactory load transference joint between adjacent slabs of concrete, or the like, are therefore carried on the spaced member in assembled relation therewith ready for unitary installation on the job. The wings 25 of the bearing plates become embedded in the slabs during pouring of the concrete so as to securely anchor the supporting units or assemblies in fixed position with relation to the slabs.

I claim:

1. A joint assembly for reinforcing two monolithically poured concrete slabs assembled as a complete self-supporting unit and when placed in operative position constituting in its entirety a permanent slab connecting joint unit and completely embedded in and connecting said slabs, when the same are poured, said joint assembly including a spacer member extending longitudinally between the slabs when poured and fitted with reinforcing means along its bottom edge, feet joined to the reinforcing means and extending laterally therefrom at spaced intervals, paired bearing plates spaced laterally and longitudinally of the joint and located at opposite sides of the spacer member adjacent the feet, said bearing plates being disengageable from the spacer member to permit the latter to be removed from the joint assembly, a dowel extending through each pair of bearing plates and projecting beyond the same and arranged to extend into the slabs adjacent thereto when the same are poured, and spring means engaging each bearing plate to hold the same in position adjacent the spacer member.

2. A joint assembly for reinforcing two monolithically poured concrete slabs assembled as a complete self-supporting unit and when placed in operative position constituting in its entirety a permanent slab connecting joint unit and completely embedded in and connecting said slabs when the same are poured, said joint assembly including a spacer member extending longitudinally between the slabs when poured and fitted with reinforcing means along its bottom edge, feet joined to the reinforcing means and extending laterally therefrom at spaced intervals, paired bearing plates spaced laterally and longitudinally of the joint and arranged one on each side of the spacer member adjacent the feet, a dowel extending through each pair of bearing plates and arranged to extend into the slabs adjacent thereto when the same are poured, and spring means engaging each bearing plate to hold the same in position adjacent the spacer member, said spacer member being provided with an opening extending downwardly from the dowel to the lower edge of the spacer member to permit removal of the latter.

3. A joint assembly for reinforcing two monolithically poured concrete slabs comprising a spacer member extending longitudinally between the slabs, when poured, opposing bearing plates arranged at intervals along the spacer member and having means extending laterally for fixed embedment in a slab remote from the body of the bearing plate, there being in each bearing plate an opening to register with the other, a dowel extending through the openings in each pair of bearing plates and fixedly secured to one of the bearing plates, a reinforcing bar extending longitudinally of the joint and forming a continuous support for the spacer member and having means extending laterally beyond opposite sides of the spacer member to provide a base sufficient to support the spacer member in an upright position, and a spring clip engaging opposite sides of the reinforcing bar and engaging also each pair of bearing plates and holding the same and the reinforcing bar firmly in position contiguous to the spacer member so that the spacer member carries the reinforcing bar, the bearing plates and the dowels in assembled relation ready for unitary installation on the job.

4. A joint assembly for reinforcing two monolithically poured concrete slabs comprising a spacer member extending longitudinally between the slabs, when poured, opposing bearing plates arranged at intervals along the spacer member, there being in each bearing plate an opening to register with the other, a dowel extending through the openings in each pair of bearing plates and fixedly secured to one of the bearing plates, a reinforcing bar extending longitudinally of the joint and forming a continuous support for the spacer member, feet extending oppositely under the reinforcing bar and secured thereto at points adjacent the bearing plates, and a spring clip having sides extending upwardly through said feet and engaging each pair of bearing plates and holding the same and the reinforcing bar firmly in position adjacent the spacer member so that the spacer member carries the reinforcing bar, the bearing plates, and the dowels in assembled relation for unitary installation on the job.

5. A joint assembly for reinforcing two monolithically poured concrete slabs comprising a vertical spacer member extending longitudinally between the slabs, when poured, opposing bearing plates arranged at intervals along the spacer member and extending downwardly to the lower edge thereof, there being in each bearing plate an opening to register with the other, a dowel extending through the openings in each pair of bearing plates, a reinforcing bar extending longitudinally of the joint and forming a continuous support for the spacer member, feet extending oppositely under the reinforcing bar and secured thereto and supporting the bearing plates, and a spring clip having sides extending upwardly through the feet of the reinforcing bar and engaging each pair of bearing plates and holding the same firmly connected to the spacer member so that the spacer member carries the reinforcing bar, the bearing plates and the dowels in assembled relation ready for unitary installation on the job.

6. A joint assembly for reinforcing two monolithically poured concrete slabs comprising a vertical spacer member extending longitudinally between the slabs, when poured, opposing bearing plates arranged at intervals along the spacer member and extending downwardly to the lower edge thereof, there being in each bearing plate an opening to register with the other, a dowel extending through the openings in each pair of bearing plates, a reinforcing bar extending longitudinally of the joint, and forming a continuous support for the spacer member, feet extending oppositely from the reinforcing bar and supporting the bearing plates and pivotally secured to the reinforcing bar, and a spring clip having sides extending upwardly through the feet of the reinforcing bar and engaging each pair of bearing plates and holding the same firmly connected to the spacer member so that the spacer member carries the reinforcing bar, the bearing plates and the dowels in assembled relation ready for unitary installation on the job.

7. A joint assembly for reinforcing two monolithically poured concrete slabs comprising a vertical spacer member extending longitudinally between the slabs, when poured, opposing bearing plates arranged at intervals along the spacer member each anchored firmly into a contiguous slab, when poured, by means of wing members extending therefrom and arranged to be embedded in said concrete, a central tongue in each plate having an opening, a dowel extending through the opening in each tongue and spanning the joint and embedded in the slabs, when poured, said plates extending downwardly from the dowel to the lower edge of the spacer member, a reinforcing bar extending longitudinally of the joint and forming a continuous support for the spacer member, feet extending oppositely under the reinforcing bar and secured thereto at points adjacent the bearing plates and supporting the same, and a spring clip having sides extending upwardly through said feet and engaging each pair of bearing plates and holding the same and the reinforcing bar firmly in position adjacent the spacer member so that the spacer member carries the reinforcing bar, the bearing plates and the dowels in assembled relation for unitary installation on the job.

8. A joint assembly for reinforcing two monolithically poured concrete slabs comprising a spacer member extending longitudinally between the slabs, when poured, opposing bearing plates arranged at intervals along the spacer member and having means extending laterally for fixed embedment in a slab remote from the body of the bearing plate, there being in each bearing plate an opening to register with the other, a dowel extending through the openings in each pair of bearing plates and fixedly secured to one of the bearing plates, a cylindrical cap spaced from the other bearing plate and slidably receiving one end of the dowel and embedded in the concrete, when poured, and permitting the dowel to adjust itself to contraction or expansion of the concrete slabs, a reinforcing bar extending longitudinally of the joint and forming a continuous support for the spacer member and having means extending laterally beyond opposite sides of the spacer member to provide a base sufficient to support the spacer member in an upright position, and a spring clip engaging opposite sides of the reinforcing bar and engaging also each pair of bearing plates and holding the same and the reinforcing bar firmly in position contiguous to the spacer member so that the spacer member carries the reinforcing bar, the bearing plate and the dowels in assembled relation ready for unitary installation on the job.

9. A joint assembly for reinforcing two monolithically poured concrete slabs comprising a vertical spacer member extending longitudinally between the slabs when poured, opposing bearing plates arranged at intervals along the spacer member and having means extending laterally for fixed engagement in a slab remote from the body of the bearing plate, there being in each bearing plate an opening to register with the other, a dowel extending through the openings in each pair of bearing plates and said bearing plates extending downwardly to the lower edge of the spacer member, a channel reinforcing bar extending longitudinally of the joint and receiving the lower edge portion of the spacer member to form a continuous support for the same, the walls of the channel bar having a return bend providing a depending outer ply, the latter being turned outwardly forming flanges extending laterally beneath the bearing plates and supporting the same, and a spring clip having sides extending upwardly through the laterally extending flanges of the channel bar and engaging each pair of bearing plates and holding the same and the reinforcing bar firmly in position contiguous to the spacer member so that the spacer member carries the reinforcing bar, the bearing plates and the dowels in assembled relation ready for unitary installation on the job.

10. A joint assembly for reinforcing two monolithically poured concrete slabs comprising a vertical yieldable spacer board extending longitudinally between the slabs, when poured, opposing bearing plates arranged at intervals along the spacer board and extending downwardly to the lower edge of the same, there being in each bearing plate an opening to register with the other, a dowel extending through the openings in each pair of bearing plates, a channel bar into which the lower edge of the spacer board is fitted and forming a longitudinal reinforcement therefor extending longitudinally of the joint, feet extending oppositely under the channel bar and secured thereto and supporting the bearing plates, and a spring clip having sides extending upwardly through the feet and engaging each pair of bearing plates and holding the same and the channel bar firmly in position contiguous to the spacer board so that the spacer board carries the channel bar, the bearing plates and the dowels in assembled relation ready for unitary installation on the job.

11. A joint assembly for reinforcing two monolithically poured concrete slabs comprising a vertical yieldable spacer board extending longitudinally between the slabs, when poured, opposing bearing plates arranged at intervals along the spacer board and extending downwardly to the lower edge of the same, there being in each bearing plate an opening to register with the other, a dowel extending through the openings in each pair of bearing plates, a channel bar into which the lower edge of the spacer board is fitted and forming a longitudinal reinforcement therefor and extending longitudinally of the joint, feet extending oppositely under the channel bar and secured thereto and supporting the bearing plates, and a spring clip having sides extending upwardly through the feet and engaging each pair of bearing plates and holding the same and the channel bar firmly in position contiguous to the spacer board so that the spacer board carries the channel bar, the bearing plates and the dowels in assembled relation ready for unitary installation on the job, said joint assembly when placed in operative position constituting in its entirety a permanent slab-connecting joint and completely embedded in and connected with said slabs when the same are poured.

JAMES H. JACOBSON.

REFERENCES CITED

The following references are of record in the file of this patent:

UNITED STATES PATENTS

| Number | Name | Date |
|---|---|---|
| Re. 21,880 | Jacobson | Aug. 19, 1941 |
| 1,298,018 | Davis | Mar. 25, 1919 |
| 1,586,326 | Older | May 25, 1926 |
| 2,082,805 | Methven | June 8, 1937 |
| 2,102,528 | Hall | Dec. 14, 1937 |
| 2,149,466 | Robertson | Mar. 7, 1939 |
| 2,167,904 | Older | Aug. 1, 1939 |
| 2,210,355 | Bauer | Aug. 6, 1940 |
| 2,210,356 | Bauer | Aug. 6, 1940 |
| 2,227,614 | Willard | Jan. 7, 1941 |
| 2,299,670 | Westcott | Oct. 20, 1942 |
| 2,319,049 | Fischer | May 11, 1943 |
| 2,321,087 | Jacobson | June 8, 1943 |
| 2,323,026 | Geyer | June 29, 1943 |
| 2,325,472 | Brickman | July 27, 1943 |
| 2,365,550 | Heltzel | Dec. 19, 1944 |